Patented Oct. 13, 1936

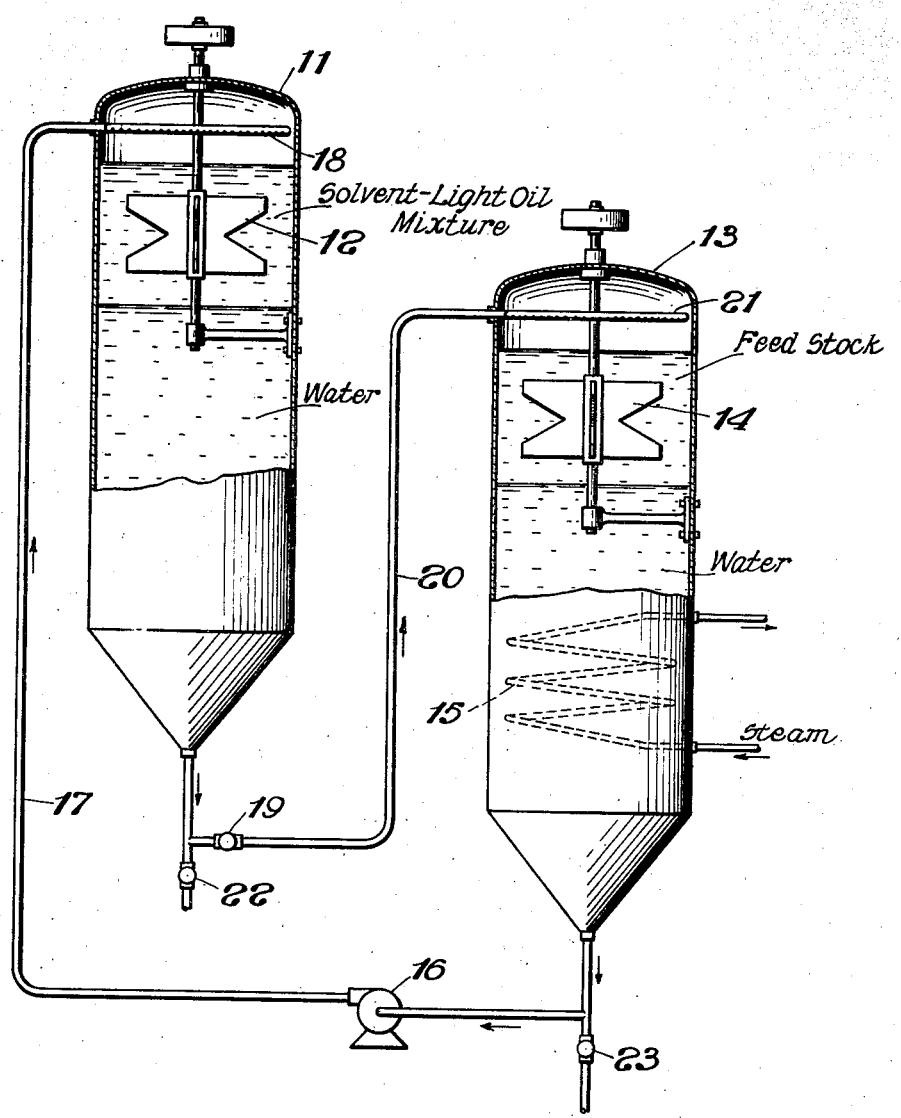

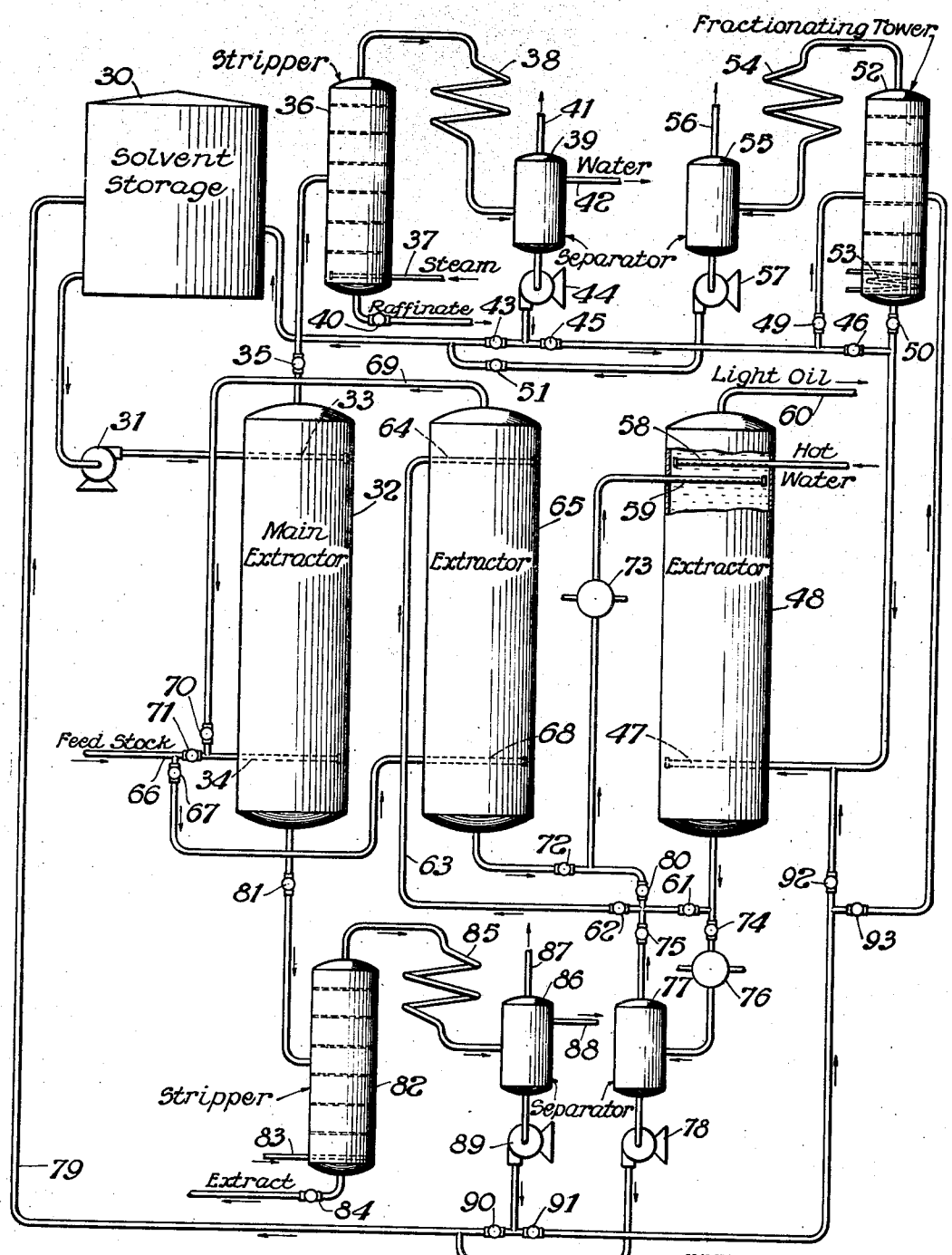

2,057,113

UNITED STATES PATENT OFFICE 2,057,113

PROCESS FOR PURIFICATION OF SOLVENTS

Jack Robinson, East Alton, Ill., assignor to Standard Oil Company, Chicago, Ill., a corporation of Indiana Application August 24, 1934, Serial No. 741,284

7 Claims. (Cl. 196—13)

This invention relates to the purification of solvents and particularly to the removal of oil from selective solvents which have been used in the solvent fractionation of oils.

A number of processes have come into use in which a petroleum oil stock such as a gasoline stock, a kerosene stock or a lubricating oil stock is treated with a selective solvent or solvent mixture to form two liquid phases known as a raffinate phase and an extract phase. Each of these phases and particularly the extract phase contains a considerable quantity of solvent. The solvent is usually recovered from the respective raffinate and extract portions of the oil by fractional distillation. For this reason a sovent or solvent mixture is commonly selected which boils appreciably above or appreciably below the boiling point of any part of the oil. It often happens, however, that the oil undergoing fractionation will contain minor constituents boiling at a temperature so close to the boiling point of the solvent used or one constituent of the solvent mixture used that separation by fractional distillation cannot be accomplished. The result is that this portion of the oil is continuously returned to the solvent fractionation sysem with the recycled solvent and accumulates or "builds up" to a point where it interferes seriously with the efficiency of the solvent fractionation operation. Thus when a lubricating oil stock is fractionated by the use of B B' dichlordiethyl ether, the solvent is removed from the raffinate and extract phases by fractional distillation, the solvent passing overhead and the oil remaining as a bottom. It often happens, however, that a small amount of light oil is present which cannot be separated from the solvent by fractional distillation and which accumulates in the solvent, particularly in the solvent from the raffinate phase and, being recycled to the system with the solvent seriously interferes with the efficacy of the solvent fractionation operation.

It is an object of my invention to separate this contaminating oil from the solvent containing it so that the contaminating oil can be discarded from the system without also discarding valuable solvent and so that the solvent can be returned to the solvent fractionation system relatively free from contaminating oil. Other and more detailed objects of my invention will become apparent as the description thereof proceeds.

The method which I use to accomplish this object is, in brief, to contact the contaminated solvent with water or other liquid which will extract the solvent, leaving the contaminating oil, and then to extract the solvent out of the water or other extraction liquid by the use of all or a portion of the oil stock passing to the main solvent fractionation operation, thereby returning the solvent to the system uncontaminated by excess oil having a boiling point in the vicinity of that of the solvent.

Numerous specific embodiments of my process will become apparent to those skilled in the art from a study of this specification. I proceed to a detailed description of two such specific embodiments for the recovery of B B' dichlordiethyl ether from contaminating light oil by extracting the former with water and then re-extracting the B B' dichlordiethyl ether from the water by means of the feed stock passing to the main solvent fractionation operation. These specific embodiments will be described with particular reference to the drawings in which:

Figure 1 is a flow diagram illustrating a batch process embodying my invention; and Figure 2 is a flow diagram illustrating a continuous process embodying my invention.

The specific embodiment shown in Figure 1 was devised to meet a situation where a stock of B B' dichlordiethyl ether had become contaminated with an excess of light oil having a boiling point too close to that of the ether to permit practical separation by fractional distillation but where it was found possible to keep such excess light oil out of the stock in the future. There was therefore no need to use expensive continuous equipment and the simple apparatus of Figure 1 was used.

Referring now more particularly to Figure 1, a quantity of the B B' dichlordiethyl ether light oil mixture to be treated and a quantity of water are placed in agitator 11, equipped with paddle 12. Similarly, a quantity of the feed stock and a further quantity of water are placed in agitator 13, equipped with paddle 14 and steam coil 15. Circulation is obtained by pumping water from the bottom of agitator 13 by means of pump 16 through line 17 and spray 18 and thence through the solvent-light oil mixture in agitator 11. As excess water accumulates in agitator 11 it levels over into agitator 13 through valve 19, line 20 and spray 21, passing through the feed stock in agitator 13. Circulation is thus maintained and the temperature is brought up to about 125° F. by means of steam coil 15 in order to prevent emulsion difficulties. Materials can be introduced into and removed from agitators 11 and 13 through valves 22 and 23 respectively.

In an actual operation conducted as described in the last paragraph I charged 150 gallons of B B' dichlordiethyl ether-light oil mixture and 170 gallons of water to agitator 11 and 150 gallons of a Mid-Continent lubricating oil distillate feed stock, S. A. E. 20, and 125 gallons of water to agitator 13. Equilibrium was reached in about 6 to 8 hours and it was then found that the water contained about 1% solvent and the feed stock contained about 10% solvent. The feed stock was then removed and charged to the solvent extraction plant and a fresh portion of feed stock was charged to agitator 13. After four such successive operations using fresh portions of feed stock, the light oil in agitator 11 was found to contain only 10% of solvent and 89% of the original solvent had been recovered and returned to the main solvent extraction system along with the feed stock. Obviously this recovery process could be repeated until practically all the solvent had been recovered and the number of steps to be used is to be determined by practical and economic considerations.

Instead of using successive extractions with fresh feed stock, similar results can be accomplished by the use of a large excess of feed stock. Thus a small amount of the solvent-light oil mixture can be treated with the whole or the major part of the feed stock used in the main solvent extraction process. Far better results can be obtained, however, by extracting the solvent from the solvent-light oil mixture with water in countercurrent fashion, thus getting as great a proportion of the solvent as may be economically feasible into the water. The water can then be re-extracted from the water by the feed stock in countercurrent fashion, thus getting as great a proportion of the solvent as may be economically feasible out of the water into the feed stock. This principle is utilized in the specific embodiment illustrated in Figure 2.

Referring now more particularly to Figure 2, a solvent, for instance B B' dichlordiethyl ether, is removed from storage tank 30 by means of pump 31 and is introduced into main countercurrent extraction tower 32, which may suitably be a packed or baffled tower, through downwardly directed spray 33 located near the top of tower 32. Simultaneously feed stock is introduced into tower 32 through upwardly directed spray 34 located near the base of the tower. The raffinate phase passes out of tower 32 through valve 35 into stripper 36 equipped with open steam coil 37 near its base. The solvent, carrying contaminating light oil, passes out of the top of the stripper, is condensed in coil 38, which may suitably be water cooled, and passes to separator 39. Raffinate oil is removed from the bottom of stripper 36 through valve 40 for further treatment or use as desired.

Fixed gases pass out of separator 39 through vent 41 and condensed steam passes out through line 42. Solvent contained in this condensed steam can be recovered by fractional distillation, by using it as a source of steam for coil 37 or otherwise as desired. A portion of the solvent from separator 39 can be pumped back to tank 30 through valve 43 by means of pump 44 and the remainder, which may be the total amount, is pumped through valves 45 and 46 into upwardly directed spray 47 located near the base of extractor tower 48, which, like tower 32, may suitably be a packed or baffled tower, for further treatment to separate the solvent from the contaminating light oil.

Instead of introducing the solvent-light oil mixture from valve 45 directly into tower 48 it can, by closing valve 46 and opening valves 49, 50 and 51, be fractionally distilled into two fractions the fraction containing the lesser proportion of light oil being returned directly to tank 30 and only the other fraction sent to extractor 48. Thus, the solvent-light oil mixture from valve 45 can be passed through valve 49 into fractionating tower 52, equipped at its base with closed steam coil 53. The overhead fraction will usually contain a lesser proportion of light oil than the bottom fraction. This overhead fraction passes through condenser 54, separator 55, (equipped with vent 56), pump 57 and valve 51 back to tank 30. The bottom fraction passes out of tower 52 through valve 50 to spray 47 in extractor 48.

The solvent-light oil mixture passing into extractor 48 flows in countercurrent contact with a stream of hot water from downwardly directed sprays 58 and/or 59 located near the top of extractor 48. The water extracts the solvent from the light oil and the latter passes out of the system through line 60 for further treatment or use as desired.

The water solution of solvent from extractor 48 can be passed through valves 61 and 62 and line 63 to downwardly directed spray 64 located in extractor tower 65 near its top. In extractor 65 the water solution of solvent passes in countercurrent contact with a stream of feed stock introduced into upwardly directed spray 68 from supply line 66 through valve 67. The feed stock extracts the solvent from the water and passes out of the top of extractor 65 through line 69 and passes into main extractor tower 32 through valve 70 and spray 34. Usually less than all of the feed stock will be used in extractor 65 and the remainder passes directly into spray 34 through valve 71.

The denuded water passes out of the base of extractor 65 through valve 72. This water will usually still contain a trace of solvent and in order to avoid losing this solvent the water is recycled to extractor 48 via heater 73 and spray 59, make-up water being supplied through spray 58.

Instead of passing the water solution of solvent from the base of extractor 48 directly into extractor 65, it is often preferable to close valve 61 and open valves 74 and 75, thus passing the solution through cooler 76. This cooling throws a portion of the solvent out of solution and this solvent is separated in separator 77 and returned to tank 30 via pump 78 and line 79. The water containing the remaining solvent can be passed, in whole or in part, to spray 64 in extractor 65 via valve 62 and line 63 and/or can be passed, in whole or in part, to spray 59 in extractor 48 via valve 80 and heater 73.

Turning now to the extract phase from main extractor tower 32, this is withdrawn through valve 81 and is stripped in stripping tower 82 equipped with open steam coil 83. The extract, stripped of solvent, is withdrawn through valve 84 and the solvent passes overhead through condenser 85 to separator 86 equipped with vent 87 and water draw-off 88.

Since the light oil usually accumulates largely in the raffinate phase it is often unnecessary to specially process the solvent from the extract phase. This solvent can, therefore, in many cases, be removed from separator 86 by means of pump 89 and returned to tank 30 via valve 90 and line 79. If, however, the solvent from the extract contains troublesome light oil a portion of this solvent can be pumped through valves 91 and 92 to extractor 48 for removal of light oil, or it can first be fractionally distilled in tower 52 by closing valve 92 and opening valve 93.

It is usually unnecessary to remove the light oil from all of the solvent, even in the case of the solvent from the raffinate phase. The continuous removal of light oil from a small portion of the solvent will usually prevent undue accumulation of light oil. In general, only a relatively small amount of the total feed stock is required to extract the solvent from the water.

In the case of solvents such as B B' dichlordiethyl ether it is desirable to add a small amount of a basic substance such as a hydroxide, carbonate or bicarbonate of an alkali or alkaline earth metal or of ammonia to the water used in my process. Thus, when operating with B B' dichlordiethyl ether the water used in extractors 48 and 65 may suitably contain from 0.05% to 2% of calcium carbonate in suspension.

Various substances may also be added to the water to prevent the formation of emulsions. Among such substances can be mentioned the water-soluble petroleum sulfonic acids and their salts, inorganic salts such as the di- and trisodium phosphates and other known emulsion breakers or emulsion preventers.

While the foregoing description speaks of the contaminating material as "light oil" it is to be understood that this is merely a relative term and does not necessarily refer to gasoline or kerosene. Furthermore, in some cases the solvent may have a higher boiling point than the bulk of the material undergoing solvent fractionation and in such cases it is the higher boiling portion which forms the contaminating material. My process can be applied to the separation of a solvent from any type of contaminating material from which the solvent can be removed with water or other extraction liquid.

When using water as the extraction liquid to separate the main solvent from the contaminating material my process is obviously limited to solvents having an appreciable solubility in water. Such solvents include, in addition to B B' dichlordiethyl ether, phenol, the cresols, individually or in admixtures, furfural, chloraniline and other well known solvents.

Extraction liquids other than water can, however, be used to meet the requirements of any particular case or the solvent properties of water can be varied by addition of other water soluble liquids to it. Thus, when operating on B B' dichlordiethyl ether, I have found that the use of aqueous ethanol is very effective in removing the solvent from the light oil, since it has a much greater solvent power for B B' dichlordiethyl ether than does water. For instance, I find that when one volume of a 50:50 mixture of the aforementioned solvent and light oil is agitated with five volumes of an aqueous solution containing 70% ethanol the remaining oil contains only 4% B B' dichlordiethyl ether while the aqueous ethanol contains 20% of the original light oil. I prefer to use somewhat weaker ethanol solutions, for instance 25% to 50% ethanol in order to avoid dissolving light oil and to improve the efficiency of the extraction of the B B' dichlordiethyl ether from the aqueous solution by the feed stock. Other compounds soluble in both water and B B' dichlordiethyl ether can be used in place of ethanol. Thus aqueous solutions of methanol, a propanol, a butanol, ethylene or propylene glycol, glycerine, a simple aldehyde or ketone, e. g. acetone, or any combination of any of these can be used.

The terms "solvent" and "extraction liquid" as used herein are intended to include mixtures except as otherwise indicated.

While I have described my invention in connection with certain specific embodiments and certain theories of operation, these are by way of illustration and not by way of limitation and I do not wish to be restricted thereto but only to the broadest legitimate scope of the appended claims in which I have endeavored to define the novel features of my invention.

I claim:
1. A process for the solvent extraction of a petroleum oil stock comprising contacting said stock with a selective solvent, separating the contacted material into two liquid phases, distilling at least one of said phases to separate the bulk of the selective solvent contained therein from the bulk of the oil contained therein, said selective solvent contained therein carrying with it a portion of contaminating oil boiling within a temperature range in the vicinity of the boiling point of said selective solvent, extracting said selective solvent from said contaminating oil with a selective extraction liquid, discarding said contaminating oil from the system, re-extracting said selective solvent from said selective extraction liquid with at least a portion of said petroleum oil stock and returning said petroleum oil stock carrying said selective solvent to said first mentioned contacting step.

2. A process according to claim 1 in which said selective solvent comprises B B' dichlordiethyl ether.

3. A process according to claim 1 in which said selective extraction liquid comprises water.

4. A process according to claim 1 in which said selective solvent comprises B B' dichlordiethyl ether and said selective extraction liquid comprises water.

5. A process for separating a selective solvent used in a mineral oil solvent extraction process from contaminating oil boiling within a temperature range in the vicinity of the boiling point of said selective solvent, comprising extracting said selective solvent from said contaminating oil with water, fractionally distilling the aqueous solution of solvent thus formed into a fraction having a higher solvent content than said solution and a fraction having a lower solvent content than said solution, recycling said first-mentioned fraction to said mineral oil solvent extraction process, re-extracting said selective solvent from said second-mentioned fraction with at least a portion of the mineral oil feed stock for said mineral oil solvent extraction process and recycling said feed stock carrying the selective solvent extracted from said second-mentioned fraction to said mineral oil solvent extraction process.

6. A process according to claim 5 in which said selective solvent is B B' dichlordiethyl ether.

7. A process for separating a selective solvent comprising B B' dichlordiethyl ether used in a mineral oil solvent extraction process from contaminating oil boiling within a temperature range in the vicinity of the boiling point of said selective solvent, comprising extracting said selective solvent from said contaminating oil with a selective extraction liquid comprising water, removing said contaminating oil from the system, re-extracting said selective solvent from said selective extraction liquid with at least a portion of the feed stock for said solvent extraction process, recycling the separated selective extraction liquid to the said re-extracting step, and returning said feed stock carrying said selective solvent but substantially free from said selective extraction liquid to said solvent extraction process.

JACK ROBINSON.